(No Model.)
T. L. RANKIN.
VALVE.
No. 312,164. Patented Feb. 10, 1885.
Fig. 1.
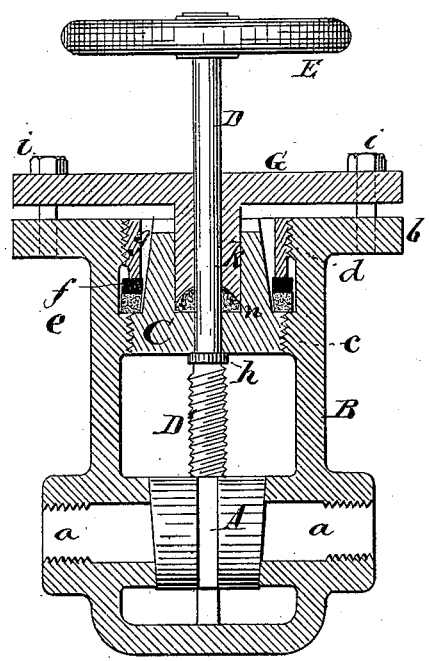
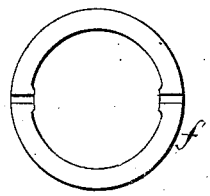
Fig. 2.
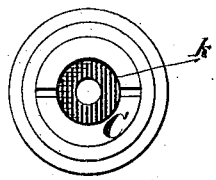
Fig. 3.
ATTEST:
J. A. Murdle
R. T. Campbell
INVENTOR:
Thos. L. Rankin
Atty.

UNITED STATES PATENT OFFICE.

THOMAS L. RANKIN, OF NEW YORK, N. Y., ASSIGNOR TO JACOB W. SKINKLE, OF CHICAGO, ILLINOIS.

VALVE.

SPECIFICATION forming part of Letters Patent No. 312,164, dated February 10, 1885.

Application filed January 5, 1883. Renewed December 26, 1884. (No model.)

*To all whom it may concern:*

Be it known that I, THOMAS L. RANKIN, of New York, in the county of New York and State of New York, have invented certain new and useful Improvements in Ice Machinery, (Ammonia-Valves for;) and I do hereby declare that the following is a full, clear, and exact description thereof, reference being had to the accompanying drawings, and to the letters of reference marked thereon, which form part of this specification, in which—

Figure 1 is a diametrical section through a valve-box and gas-valve designed for ammonia refrigerating-machines and other purposes. Fig. 2 is a top view of a screw-ring for compressing the packing. Fig. 3 is a top view of the main screw-threaded stem-guide.

This invention relates to an improvement on stuffing-boxes which are especially designed for valves which are used for cutting off and regulating the flow of ammoniacal gas and other gases through pipes in refrigerating-machines, but which is also useful for valves designed for other purposes wherein the stuffing-boxes are required to be kept gas-tight.

The following description of my invention, when taken in connection with the annexed drawings, will enable others skilled in the art to fully understand it.

The valve-box is constructed with a passage, $a$, having female tapped threads to receive pipes and allow the same to be coupled to the box. This passage is provided with a wedge-shaped valve, A, for cutting off or regulating the passage of gas or water.

B designates the cylindrical body of the valve-box, which is cast on the shell through which the passage $a$ is formed, and which is constructed with an annular flange, $b$, on its upper end, and also with annular screw-threaded constrictions $c$ $d$ inside of it, as shown in Fig. 1.

C designates a chambered guide, which is screwed into the constriction $c$, and constructed with a tapered body having notches in its upper end, to receive the instrument used for screwing it into its place and removing it when desired.

Between the tapered body of the guide C and the inner surface of the body B of the valve-box I apply a packing-ring, $e$, of india rubber, lead, or other suitable material, and on this packing I apply a metal ring, $f$, which is held down firmly by means of a ring, $g$, screwed into the constriction $d$. By these means I effectually prevent leakage of gas around the outside of the guide C.

D designates the stem of the valve, which stem has a hand-wheel, E, on its upper end, and a screw, D', on that part of it which is below a collar, $h$, at the base of the guide C, by means of which screw the valve is operated. The smooth part of the stem D passes through the center of the guide C, and through the follower $k$ of the valve-box cap G, and is closely packed at $n$ by any suitable material, which is tightly compressed below the concave end of the follower $k$ by the screws $i$ $i$, which confine the said cap upon the valve-box.

I have shown a well-known kind of valve A applied in the valve-box; but I do not confine my invention to such valve, as any well-known or improved valve may be substituted which will operate in connection with my improved stuffing-box.

Having thus fully described my invention, what I claim as new, and desire to secure by Letters Patent, is—

1. The combination of the valve-box body, the chambered valve-stem guide C, the packing $e$, and rings $f$ $g$, and the packing of the valve stem confined by the follower of the cap G, all constructed and adapted to operate substantially in the manner and for the purposes described.

2. In a gas-valve stuffing-box, the combination, with the valve-stem and the body B, of the screw-guide C, screw-ring $g$, metal ring $f$, and the packing $e$, adapted to operate substantially in the manner and for the purposes described.

In testimony that I claim the foregoing as my own I affix my signature in presence of two witnesses.

THOMAS L. RANKIN.

Witnesses:
JOHN H. STITT,
T. H. ALEXANDER.